United States Patent [19]

Taylor

[11] Patent Number: 4,702,700
[45] Date of Patent: Oct. 27, 1987

[54] ACTIVITY BOOK WITH REMOVABLE MANIPULATIVES

[76] Inventor: Cheryl J. Taylor, 520 Chapel Rd., Amelia, Ohio 45102

[21] Appl. No.: 946,596

[22] Filed: Dec. 29, 1986

[51] Int. Cl.$^4$ .............................................. G09B 1/08
[52] U.S. Cl. .................................... 434/168; 434/178; 434/429
[58] Field of Search ............... 434/429, 168, 190, 330, 434/428, 430, 178

[56] References Cited

U.S. PATENT DOCUMENTS

| | | | |
|---|---|---|---|
| 1,405,134 | 1/1922 | Hoyme | 434/178 X |
| 2,946,137 | 7/1960 | Worth et al. | 434/178 |
| 3,316,669 | 5/1967 | Nachbar | 434/429 |
| 3,380,176 | 4/1968 | Kling et al. | 434/330 |
| 3,496,653 | 2/1970 | Wolfner et al. | 434/168 |
| 3,726,026 | 4/1973 | Borcherding | 434/430 |
| 3,928,921 | 12/1975 | Gurman | 434/428 |

Primary Examiner—William H. Grieb
Attorney, Agent, or Firm—Charles R. Wilson

[57] ABSTRACT

An activity book is constructed to have multi educational features especially useful for teaching reading readiness skills to young children. The book comprises a set of bound pages. A plurality of pages have visual objects thereon with magnetic means mounted within the outline of the visual object. A pocket is also found on the page with a set of manipulatives contained therewithin. Magnetic means on the manipulatives and on the pocket permit a variety of educational uses involving word association and matching.

7 Claims, 3 Drawing Figures

ACTIVITY BOOK WITH REMOVABLE MANIPULATIVES

This invention relates to activity books. More particularly, the invention relates to activity books that contain multi educational features for young children.

BACKGROUND OF THE INVENTION

Several books for the purpose of teaching young children to read have been published. They have taken on various formats. Most books reflect the consensus of educators that repetition of words is a very important aspect of the learning process. To be effective, the repetition should not be a monotonous drill, but should be presented in such a way as to maintain the child's interest at a high level and encourage accuracy of perception. Books generously illustrated with pictures of boldly colored distinct objects are more likely to retain a child's interest than unillustrated books. Books full of illustrations and replete with series of repetitious words would seem to be optimum; in fact, most books used for teaching reading skills to children are so formatted.

Another aspect to the teaching process for improving reading skills utilizes word/object associations. For example, a word is printed on or directly next to a visual representation of that word. Such an association may be repeated several times throughout a book. U.S. Pat. No. 3,496,653 contains a disclosure of this type of book.

A common drawback with prior books is that they are very limited in their use. A book may contain a series of stories where a small number of words are repeated several times. Such a book does provide a useful function, but has diminished usefulness once it has been read. Other available books based on the concept of word/object associations suffer from the same limited usefulness.

There is a need for a book which provides a varied method of teaching reading skills based on generally accepted methods. Such a book would not be monotonous to the child. Additionally, the book would be capable of being used in a variety of learning exercises. Such a variety would make the book interesting and challenging to the child while giving the teacher/parent a choice of options tailored to fit a particular child's learning needs and degree of advancement. Any book, of course, must be capable of mass production at a reasonable cost. In accord with the invention herein, a book has been developed which fulfills the objectives of teaching reading skills in a variety of ways.

SUMMARY OF THE INVENTION

An activity book with multi educational features comprises a set of bound pages. A plurality of the pages have a visual object thereon with at least one magnetic means mounted within the outline of the visual object, a pocket as a part of the page, removable manipulatives capable of being stored within the pocket and having magnetic means associated therewith, and additional magnetic means positioned on the page. The manipulatives are shaped to match like and unlike visual objects on the page or are block-shaped with printed words which match the visual object or the same printed word on the page. Magnetic means positioned on the manipulatives and the page permit a variety of learning processes using the manipulatives and the page.

DETAILED DESCRIPTION OF THE INVENTION

The paragraphs which follow describe the activity book of this invention with particular reference to individual pages. Some of the many varied educational features permitted by the book's unique construction are also described.

Figure 1:
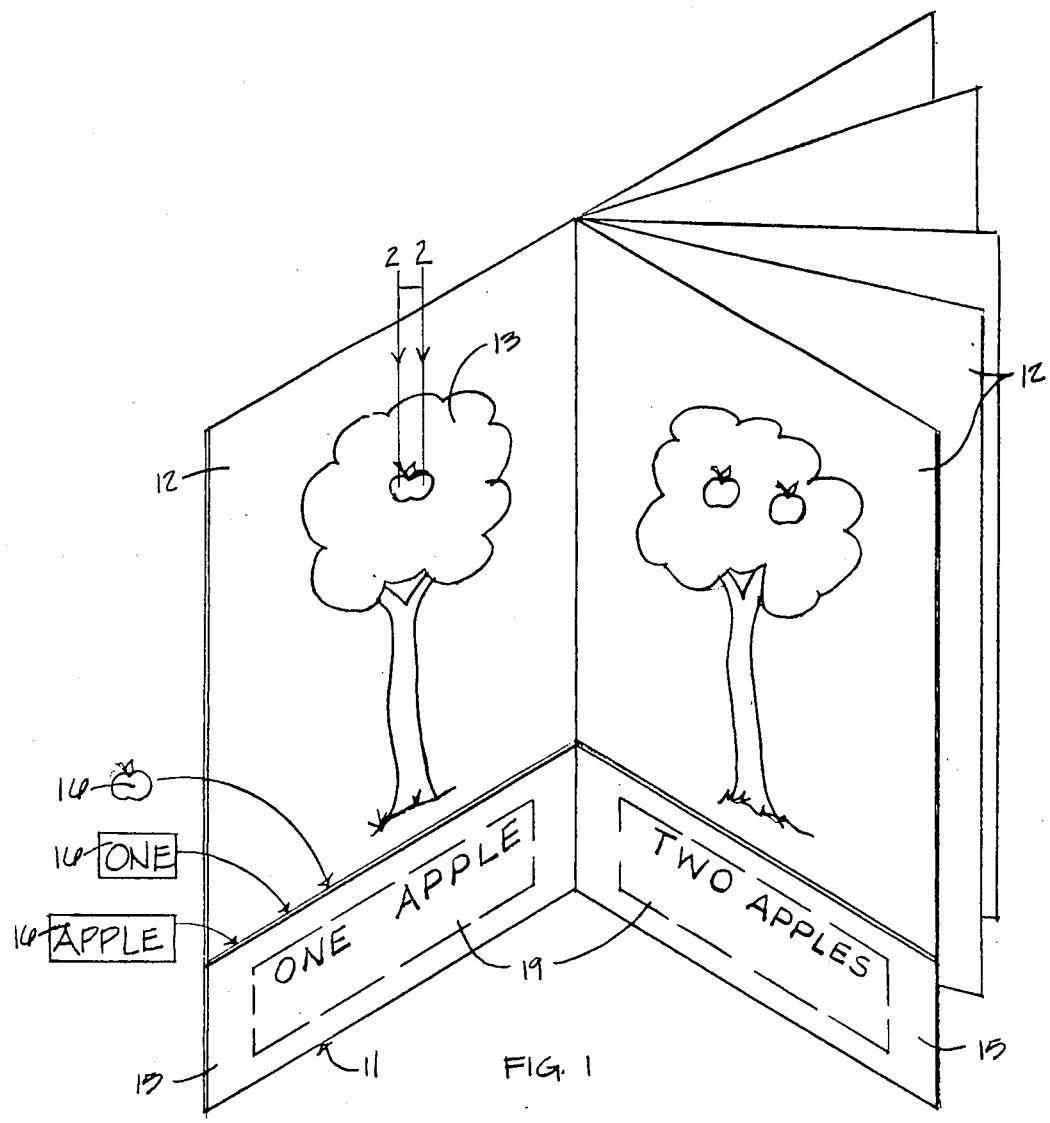
FIG. 1 is a view in perspective of a book of this invention.
Figure 2:
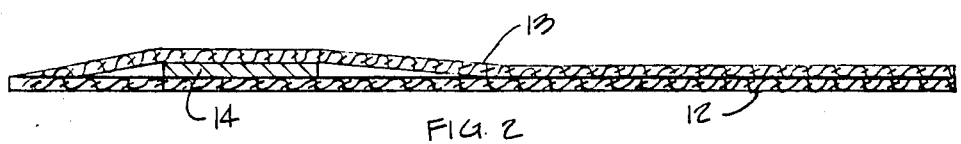
FIG. 2 is a sectional view taken along line 2—2 of FIG. 1.

With reference to FIG. 1, there is shown an activity book 11 comprised of several pages 12. A plurality of the pages are the same in construction as the two pages which are evident in the illustration. Each page can be manufactured from a conventional material used in books. Preferred is a woven fabric material because of its durability and cleanability. The page has a visual object 13 affixed to its face. Such object can be sewn, printed or attached by adhesive means and is considered an integral part of the page. As shown, a tree with a single apple is depicted. A magnetic means 14 is mounted on the page and within the outline of the visual object for reasons explained in the following paragraphs. The magnet means 14 can be positioned within the page as shown in FIG. 2 or can be adhered to the surface of the page with an appropriate facing for appearance purposes. The magnetic means itself is in the form of a thin strip and is commercially available.

A pocket 15 is also provided on the page. The pocket is sized to hold a number of removable manipulatives in a relatively secure fashion. As shown, the pocket is added by positioning a piece of fabric across the page's width and attaching it at the bottom and side edges. Velcro closure means (not shown) can be placed on the inside top of each pocket with mating Velcro on the page itself to close the pocket so as to maintain its contents.

Figure 3:
FIG. 3 is a side view of a manipulative used with the book of FIG. 1.

A set of removable manipulatives 16 is provied for use with the activity book. Such manipulatives are normally contained within pocket 15 of the page 12 and are intended for use with that page. The manipulative also has magnetic means 17 either positioned within it or added to its back surface. As shown in FIG. 3 the manipulative has a fabric top surface 18 with magnetic means 17 positioned on the bottom. The size of the manipulatives is large enough so as not to pose a health hazard from accidental swallowing, but not so large it will be unable to fit within the pocket and come within the confines of a particular page. Generally, the manipulative ranges in width and length between about one inch to about four inches, preferably between about one and one-half inches to about three inches. It can take on many different shapes, including a like shape to match the printed visual object on the page, an unlike shape and block-shaped with appropriate word or words printed on it. The particular shape and/or word will depend on the particular educational feature desired. An appropriate word can optionally be printed on the back of a manipulative as a part of one of the educational features built into the activity book. The particular means used for holding a manipulative to a page, i.e. the magnetic means allows this feature.

Additional magnetic means 19 are positioned on the face of the pocket portion. Such means are of sufficient size that at least two, preferably two to five, of the manipulatives can be positioned on it and securely held. Printed words can be printed over or in close association with the magnetic means. As a part of the preferred reading exercises possible with this activity book is the provision of means whereby a manipulative with a word printed on its face can be placed directly on or directly under the same printed word on the page. For this reason the magnetic means 19 on the pocket is large enough to have attached thereto at least two of the manipulatives. Alternatively, two strips of magnetic means can be strategically positioned on the pocket to in effect perform the function of the one large magnetic means 19. A thin strip of magnetic material is preferably adhered to the surface of the page for optimum attraction to the magnetic means found on the manipulatives. As a side benefit, the magnetic means on the pocket exerts an attraction to the removable manipulatives contained within the pocket during non-use, thereby helping to keep the book and manipulatives intact.

As above described magnetic means are used underneath a visual object's surface, on the removable manipulatives and on the pocket portion of the page. As should be apparent the particular polarity of any magnetic means must be chosen with regard to the polarity of the magnetic means with which it will be associated. Preferably, the magnetic means used with the manipulatives have a polarity opposite that of the magnetic means used with the visual objects and the pockets. As well known, however, any ferrous metal is capable of having a magnetic force artificially imparted to it; accordingly, a ferrous metal can be used which will become magnetized by magnetic means closely associated with it at least temporarily.

In a preferred embodiment, a pocket is provided in at least a front cover for the purpose of holding instructional sheets. The unique construction of the present activity book allows such an optional feature without detracting from the overall function or appearance of the book.

A wide variety of educational features can be built into the book based on the above discussed physical charecteristics of the activity book. Among the many varied educational exercises a child can do because of the construction of the activity book include: a story can be read to the child; the child can point to a certain object upon request; the child can be asked to identify colors on a page; the child can count objects on a page while touching each object; the child can place a manipulative on an appropriate object on the page as the teacher/parent reads the book; the child can learn addition by counting the manipulatives; word/object associations can be learned by the child by placing word manipulatives on or below corresponding printed words on a page; the child can learn size concepts by appropriately illustrated visual objects on a page; the child can be taught shape recognition by appropriately shaped visual objects and manipulatives; the child can learn to match like objects; the child can match number words to correct numerals by proper selection of manipulatives; the child can match printed words to visual objects; the child can read to the teacher based on the words and visual objects on a page; and the child can properly order words in a sentence either with or without the aid of printed words on the page.

It should be apparent that while the present invention has been described with reference to the drawings, obvious embodiments and variations not described are within the scope of the invention.

What is claimed is:

1. An activity book with multi educational features for self-learning and directed learning by children comprises a set of bound pages, a plurality of which are characterized by (a) having a visual object thereon with at least one magnetic means mounted within the outline of the visual object, (b) a pocket as an integral part of the page, (c) removable manipulatives capable of being stored within said pocket and having magnetic means for removably attaching to other magnetic means, and (d) additional magnetic means positioned on the pocket of sufficient size that at least two of the manipulatives can be placed thereon and securely held.

2. The activity book of claim 1 wherein each page is made of a durable fabric.

3. The activity book of claim 2 wherein the magnetic means associated with each page are secured to the surface of said page.

4. The activity book of claim 3 wherein the removable manipulatives have a width and length ranging from about one inch to about four inches.

5. The activity book of claim 4 wherein the polarity of the magnetic means on the manipulatives is opposite the polarity of the other magnetic means.

6. The activity book of claim 1 further comprising a pocket on an inside cover of the book for holding instructional papers.

7. The activity book of claim 1 wherein each of the removable manipulatives has wording on its backside for use in conjunction with the visual objects on the pages and any wording on the pages.

* * * * *